United States Patent [19]

Takahashi

[11] 4,374,037

[45] Feb. 15, 1983

[54] METHOD FOR PREPARING DIVALENT-EUROPIUM-ACTIVATED CALCIUM SULFIDE PHOSPHORS

[75] Inventor: Tatsuo Takahashi, Isehara, Japan

[73] Assignee: RCA Corporation, New York, N.Y.

[21] Appl. No.: 391,417

[22] Filed: Jun. 23, 1982

[51] Int. Cl.$^3$ ............... C09K 11/12; C09K 11/14; C09K 11/46
[52] U.S. Cl. .................. 252/301.4 S; 423/561 R
[58] Field of Search .............. 252/301.4 S, 301.4 H, 252/301.4 R; 423/561 R

[56] References Cited

U.S. PATENT DOCUMENTS

| | | | |
|---|---|---|---|
| 2,372,071 | 3/1945 | Fernberger | 252/301.4 |
| 2,988,515 | 9/1958 | Wachtel | 252/301.4 |
| 3,673,102 | 6/1972 | Lehmann et al. | 252/301.4 |
| 3,898,174 | 8/1975 | Lehmann | 252/301.4 |

OTHER PUBLICATIONS

"Oxidation States of Europium in the Alkaline Earth Oxide and Sulfide Phosphors," P. M. Jaffe & E. Banks, *J. Electrochem. Soc.* 102, 518–523, (1954).
"Cathodoluminescence of CaS:Ce$^{3+}$ and CaS:Eu$^{2+}$ Phosphors," W. Lehmann & F. M. Ryan, *J. Electrochem. Soc.* 118, 477–482, (1971).
"Effect of the Rate of Cooling on the Emission of CaS:Ce Phosphor," D. R. Vij & V. K. Mathur, *J. Electrochem. Soc.* 122, 310–311, (1975).

*Primary Examiner*—O. R. Vertiz
*Assistant Examiner*—Steven Capella
*Attorney, Agent, or Firm*—E. M. Whitacre; D. H. Irlbeck; L. Greenspan

[57] ABSTRACT

A method for preparing a divalent-europium-activated calcium sulfide phosphor comprising reacting a molten mixture consisting essentially of alkaline-earth-metal chloride and europium chloride with gaseous carbon disulfide at temperatures between 850° and 1200° C. for 1 to 6 hours. The molten mixture may include activator proportions of cerium and/or alkali metal cations. Minor proportions of calcium may be replaced with one or more other alkaline-earth-metal cations.

8 Claims, 4 Drawing Figures

METHOD FOR PREPARING DIVALENT-EUROPIUM-ACTIVATED CALCIUM SULFIDE PHOSPHORS

BACKGROUND OF THE INVENTION

This invention relates to a new method for preparing divalent-europium-activated calcium sulfide phosphors.

In the past, rare-earth-activated CaS (calcium sulfide) phosphors were prepared by one of the following three methods: (1) the flux method in which a mixture of calcium sulfate and a suitable rare-earth compound is reduced with carbon in sodium sulfate or other suitable flux; (2) the solid-state-reaction method in which a mixture of sulfides is reacted in a sulfurizing atmosphere such as sulfur vapor or hydrogen sulfide, or (3) the direct-sulfurization method in which a mixture of carbonates or/and sulfates is reacted with hydrogen sulfide. In these methods, strontium and/or barium may be substituted for at least part of the calcium.

In the case of the flux method, a fairly large amount of alkali is inevitably incorporated in CaS crystals, and anion impurities are reported to have little effect on luminescent properties. In the case of the solid-state reaction and direct-sulfurization methods, the incorporation of other anions, such as P, As, and halogen, is reported to improve luminescent properties. In particular, the efficiency of a CaS phosphor containing 0.1 mole % Eu and 0.005 mole % Ce (with respect to Ca) is reported to be improved as much as 30% by incorporating 0.2 to 1 mole % Cl and 0.005 to 0.23 mole % P. The body color of phosphors that contain optimum Eu concentrations (0.05 to 0.1 mole %) is brownish yellow in the case of the flux method, and is light pink in the case of phosphors prepared by the solid-state reaction and direct-sulfurization methods.

SUMMARY OF THE INVENTION

The novel method comprises reacting a molten mixture consisting essentially of calcium chloride and europium chloride with gaseous carbon disulfide at temperatures between 800° and 1200° C. for 1 to 6 hours. In a preferred embodiment, a mixture of calcium chloride and one-mole-percent europium chloride is reacted in a flowing mixture of carbon disulfide and a nonoxidizing carrier gas at about 1000° C. for about 2 hours. The reaction produces crystals of phosphor consisting essentially of calcium sulfide activated with divalent europium. These crystals may be used as they are formed, or may be crushed to a powder. The luminescence of the powder may be enhanced by annealing the powder in a reducing atmosphere at about 1000° to 1100° C. for 1 to 10 hours. The novel method may incorporate activator proportions of cerium and/or alkali metal cations. Minor proportions of calcium may be replaced with one or more other alkaline-earth-metal cations.

DESCRIPTION OF THE PREFERRED EMBODIMENTS

Figure 1:
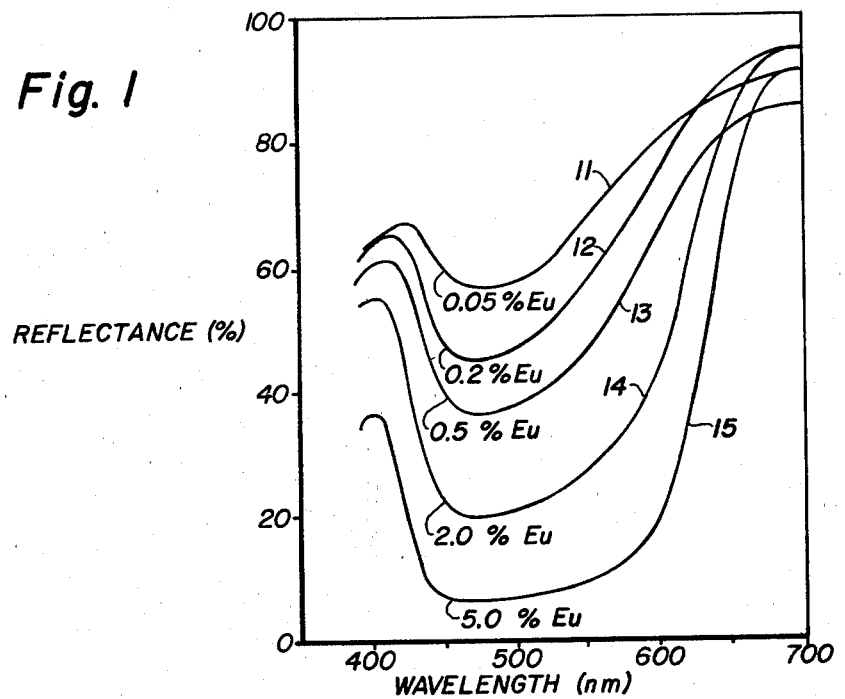
FIG. 1 is a group of spectral reflectance curves for five phosphors prepared by the novel method.

The preferred embodiments of the novel method produce divalent-europium-activated calcium sulfide phosphor (CaS:Eu). In general, the preferred procedure is as follows. Calcium chloride dihydrate ($CaCl_2.2H_2O$), europium chloride hexahydrate ($EuCl_3.6H_2O$), optionally cerium chloride heptahydrate ($CeCl_3.7H_2O$) and/or sodium chloride (NaCl), are dissolved in high-purity methyl alcohol (methanol) in an evaporating dish. After complete dissolution, the solution is roughly brought to dryness in an electric oven at 60° to 80° C., then to complete dryness in a vacuum oven at 160° to 200° C. The white recrystallized sample is then placed in a glassy carbon boat. The carbon boat is placed in a quartz combustion tube in an electric tube furnace. After purging the air with an inert gas, the sample is heated in an inert gas or hydrogen gas stream that has previously been bubbled through a washing bottle filled with carbon disulfide ($CS_2$). The heating is conducted at 850° to 1200° C. for 1 to 6 hours and then cooled in the gas stream. Red dendritic crystals of CaS:$Eu^{2+}$, up to a few mm in size, are obtained after the reaction. The crystals are washed in alcohol and water to remove unreacted chlorides. After washing and drying, the crystals are crushed into powder. The powder sample is used for various measurements and also for subsequent annealing. The annealing is done in a reducing atmosphere of 96% $N_2$+4% $H_2$ gas at about 1000° to 1100° C. for a few hours. Test results are compared with the properties of a commercial nonpigmented red-emitting europium-activated yttrium oxysulfide phosphor used in color television picture tubes as a standard. That $Y_2O_2S$:Eu standard contains about 3.55 mole percent europium and about 35 parts of terbium per million parts of phosphor. The $Y_2O_2S$:Eu standard carries the commercial designation 33-Y911B of RCA Corporation, Lancaster, PA. Some specific examples are now described.

EXAMPLE I 4.3665 g of $CaCl_2.2H_2O$ and 0.1099 g of $EuCl_3.6H_2O$ (1.0 mole % of $CaCl_2$) were dissolved in methanol (99.9%). After drying, the sample was placed in a glassy carbon boat and heated in a $H_2$+Ar+$CS_2$ gas flow ($H_2 \sim 7$ ml/min and Ar$\sim 20$ ml/min) at 1000° C. for 2 hours. Red dendritic crystals of CaS:$Eu^{2+}$, up to a few mm in length, were found to form. Under the excitation of an electron beam of 8 kv, 1 $\mu$a.cm$^{-2}$, the total output efficiency of the crushed crystals was about 35% of a $Y_2O_2S$:Eu standard. The peak maximum wavelength $\lambda_{max}$ of red emission was at 642$\pm$1 nm with CIE color coordinates of x=0.698 and y=0.301.

EXAMPLE II 4.4057 g of $CaCl_2.2H_2O$, 0.0110 g of $EuCl_3.6H_2O$ (0.1 mole %) and 0.0011 g of $CeCl_3.7H_2O$ (0.01 mole %) were dissolved in methanol. The dried sample was heated in a $H_2$+$CS_2$ gas flow ($H_2 \sim 25$ ml/min) at 1000° C. for 4 hours. Crystals of CaS:Eu:Ce formed. Under the excitation of an electron beam of 8 kv, 1 $\mu$a.cm$^{-2}$, the total output efficiency of the crushed crystals was about 29% of that of the $Y_2O_2S$:Eu standard. CIE color coordinates were x=0.532 and y=0.417.

EXAMPLE III 4.3656 g of $CaCl_2.2H_2O$, 0.1099 g of $EuCl_3.6H_2O$ (1.0 mole %), 0.0011 g of $CeCl_3.7H_2O$ (0.01 mole %) and 0.0002 g of NaCl (0.01 mole %) were dissolved in methanol. The dried sample was heated in a $H_2+CS_2$ gas flow ($H_2 \sim 30$ ml/min) at 1000° C. for 1.5 hours. Crystals of CaS:Eu:Ce:Na formed. Under the excitation of an electron beam of 8 kv, 1 μa/cm$^2$, the total output efficiency of the crushed crystals was about 57% of the $Y_2O_2S$:Eu standard. After annealing in a reducing atmosphere of $N_2+4\%$ $H_2$ gas at 1100° C. for 2 hours, the total output efficiency of the crushed crystals became about 71% of the $Y_2O_2S$:Eu standard.

DESCRIPTION OF PROPERTIES

Shown in FIG. 1 are spectral reflectance curves 11, 12, 13, 14 and 15 of five different CaS:Eu phosphors prepared by the novel method. The phosphors have five different concentrations of divalent europium ($Eu^{2+}$) activator from 0.05 to 5.0 mole percent. The reflectance was measured using magnesium-oxide (MgO) powder as a reference. Red body color becomes deeper and more light absorbing with increasing $Eu^{2+}$ concentration.

Figure 2:
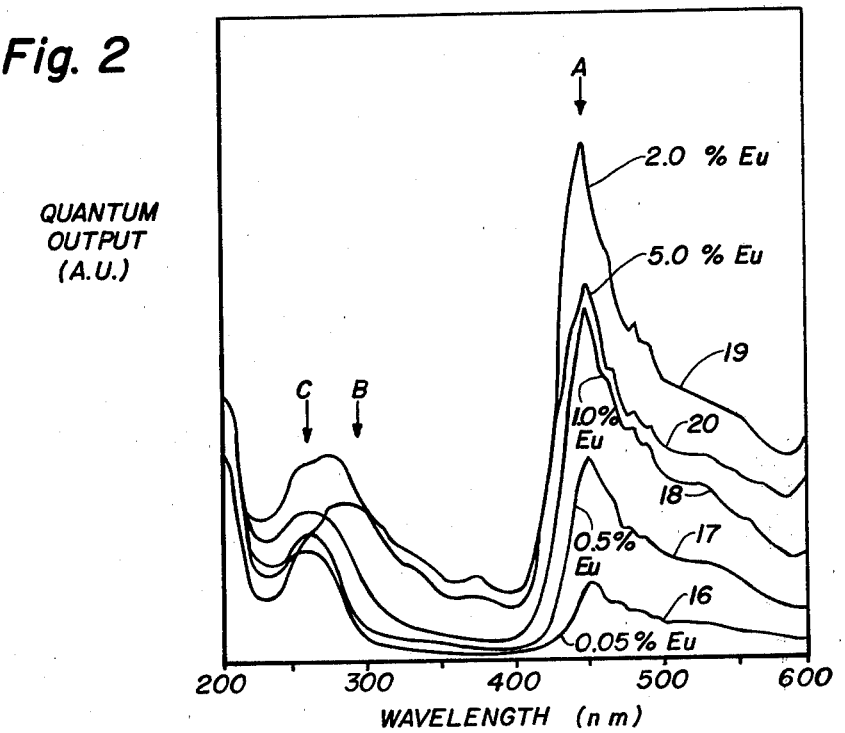
FIG. 2 is a group of curves showing the cathodoluminescence emission spectra for five phosphors prepared by the novel method.

Curves 16, 17, 18, 19 and 20 of excitation spectra for luminescence emission of five different CaS:$Eu^{2+}$ phosphors prepared by the novel method are shown in FIG. 2. The excitation was by electron beam at 8 kv and about 1 μa/cm$^2$. As can be seen, the strong band at $\lambda_{exc} \sim 450$ nm becomes maximum at a $Eu^{2+}$ concentration of about 2 mole %.

Figure 3:
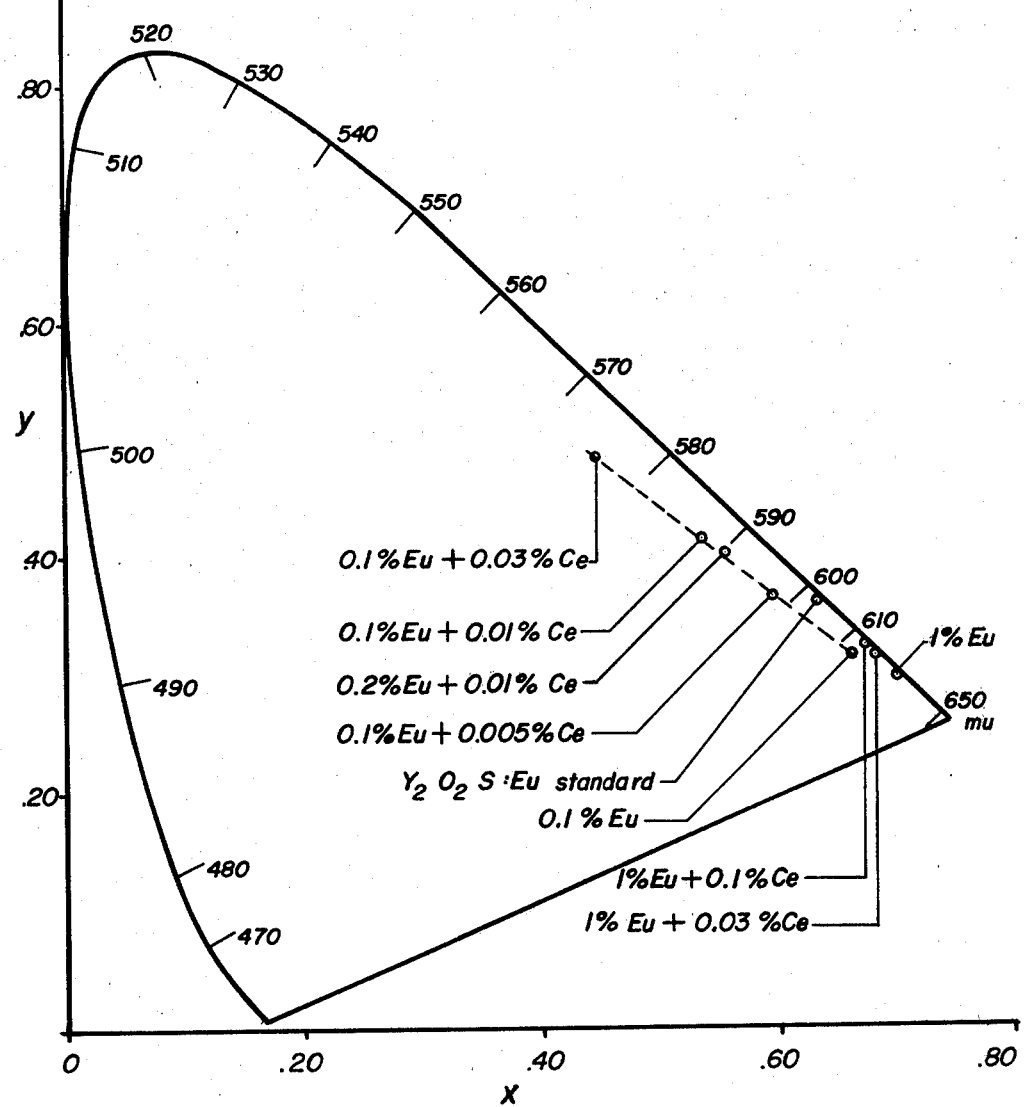
FIG. 3 is a CIE diagram showing the locations of the emissions for several phosphors prepared by the novel method as compared with the location for a typical $Y_2O_2S$:Eu phosphor used in commercial color television picture tubes.

Shown in FIG. 3 are the locations by CIE color coordinates of the emissions of CaS:Eu:Ce phosphors prepared by the novel method with different concentrations of $Eu^{2+}$ and $Ce^{3+}$ in mole percent under electron beam excitation. At lower $Eu^{2+}$ concentrations (<0.2 mole %), the green emission of $Ce^{3+}$ is predominant, particularly at higher $Ce^{3+}$ concentrations. But, at higher $Eu^{2+}$ concentrations ($\geq 1.0$ mole %), the $Ce^{3+}$ emission is depressed even at higher $Ce^{3+}$ concentrations.

Figure 4:
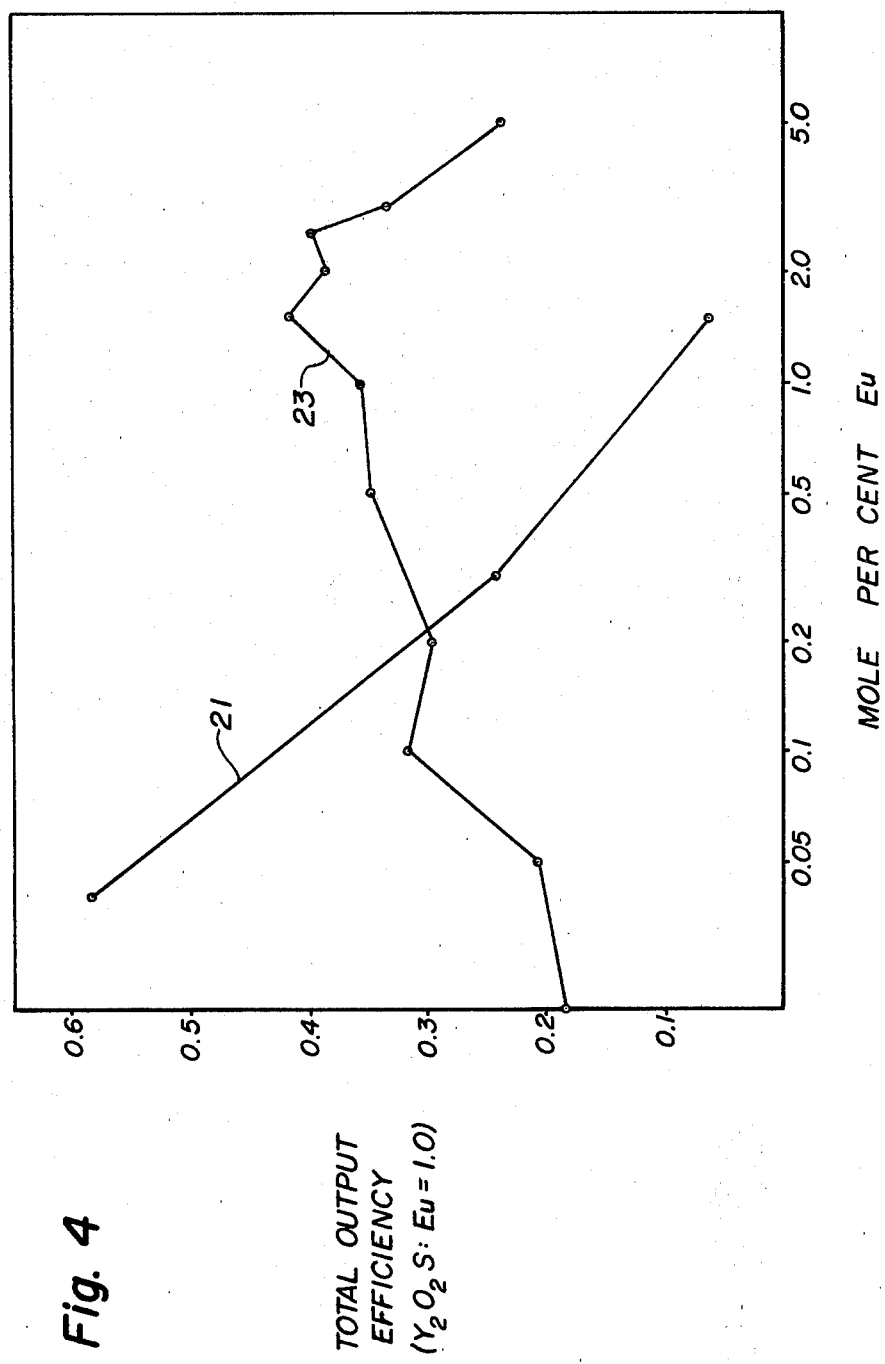
FIG. 4 is a group of curves showing total output efficiencies, relative to that of a $Y_2O_2S$:Eu standard, for CaS:Eu phosphors prepared by a prior method and by the novel method.

Shown in FIG. 4 are curves showing relative total output efficiencies of a CaS:Eu phosphor with respect to the $Y_2O_2S$:Eu standard under the excitation of an electron beam of 8 kv, 1 μa.cm$^{-2}$ as a function of Eu concentration. Shown in FIG. 4 is a curve 21 for the results for a prior flux-grown CaS:Eu phosphor and a curve 23 for the results of CaS:Eu phosphors prepared by the novel method. The optimum $Eu^{2+}$ concentration for phosphors prepared by the novel method is of the order of 1 to 2 mole %. This is about an order of magnitude higher than the optimum activator concentration reported for the CaS:Eu phosphors prepared by other methods.

One of the remarkable characteristics of the phosphor prepared by the new method is that the optimum activator $Eu^{2+}$ concentration for red emission ($\lambda_{max} \sim 650$ nm) is of the order of 1 mole %, roughly an order of magnitude higher than that of CaS:Eu phosphors prepared by other methods. By virtue of a higher $Eu^{2+}$ activator concentration, the body color of the phosphor of the present invention is deep red. This red body color is particularly desirable for use in recent CRT viewing screens. In recent picture tubes for use in color television receivers, use is made of so-called pigmented phosphors comprising phosphor cores that have a thin coating of nonluminescent pigment material whose body color matches the emission color of the phosphor cores to achieve better color reproduction. Therefore, the phosphor that has a matching body color to its emission color makes the use of a pigment on the phosphor unnecessary. Moreover, the present phosphor also exhibits strong red emission under the irradiation of blue light ($\lambda \sim 450$ nm). This property seems to be most desirable as a fluorescent red pigment to be used in road signs and various other signboard display applications.

Alternatives

The luminescence efficiency of powder phosphor samples prepared by grinding "as grown" dendritic crystals can be improved in some cases by annealing them in a reducing atmosphere at high temperatures. The most striking improvement was attained for the case of CaS:Eu,Ce,Na phosphor, where $Na^{1+}$ is added in the form of NaCl (as in Example III) in the same mole percent as Ce to compensate for an extra charge of $Ce^{3+}$. The exact mechanism that brings about the improvement is unknown, but it could be related to the improved crystallinity of phosphor particles as well as to the removal of excess $Cl^{1-}$ ions in the phosphor. Some examples of the annealing effect for cathodoluminescent properties are shown in the Table. Annealing was carried out at 1100° C. for 2 hours in a reducing atmosphere of $N_2+4\%$ $H_2$. Improvement in photoluminescence in proportion to that in cathodoluminescence was also observed for these samples.

TABLE

| Phosphor Composition (mole %) | Relative Total Output Efficiency* | |
|---|---|---|
| | Before Annealing | After Annealing |
| 1% Eu | 0.28 | 0.29 |
| 1% Eu + 0.03% Ce | 0.41 | 0.33 |
| 0.5% Eu + 0.025% Ce | 0.48 | 0.54 |
| 1% Eu + 0.01% Ce + 0.01% Na | 0.53 | 0.71 |
| 1% Eu + 0.1% Ce + 0.1% Na | 0.26 | 0.58 |

*At an accelerating voltage 8 kv, beam current 1 μa·cm$^{-2}$, the total output efficiency of a $Y_2O_2S$:Eu standard = 100.

While the novel method has been described with respect to producing CaS:Eu and CaS:Eu:Ce phosphors, other phosphors may be prepared by the novel method. Other alkaline-earth metals, for example strontium, barium and/or magnesium, may be substituted for a minor part of the calcium. Some other phosphors that can be prepared by the novel method are (Ca,Sr)S:Eu, (Ca,Sr)S:Eu:Ce, (Ca,Sr)S:Eu:Ce:Na and (Ca,Mg)S:Eu.

Consideration has been given to substituting another halide for part or all of the chloride whenever it is used. Fluorides should be avoided throughout the novel method. Calcium fluoride, which has properties similar to calcium oxide, is probably very difficult to sulfurize, even in the molten state. Also, calcium fluoride cannot be dissolved in methanol, and good dispersion in the form of a solution is important for practicing the novel method. Both calcium bromide and calcium iodide are difficult to make anhydrous. These compounds have low melting points and high vapor pressures at elevated temperatures and, therefore, should be difficult to convert completely to sulfides.

Carbon disulfide may, in principle, be replaced with other materials, such as methyl mercaptan, that are gaseous at or near room temperature and contain both carbon and sulfur in chemically-combined form. However, experimental work with the novel method has been limited to the use of carbon disulfide.

Cations of one or more alkali metals, such as potassium and lithium, may substitute for part or all of $Na^{1+}$ whenever it is used.

What is claimed is:

1. A method for preparing a divalent-europium-activated calcium sulfide phosphor comprising reacting a molten mixture consisting essentially of calcium chloride and europium chloride with gaseous carbon disulfide at temperatures between 850° and 1200° C. for 1 to 6 hours.

2. The method defined in claim 1 wherein said mixture includes a cerium chloride.

3. The method defined in claim 1 wherein said mixture includes a chloride of an alkali metal.

4. The method defined in claim 1 wherein said molten mixture is heated in a closed chamber, and a gaseous mixture of carbon disulfide vapor and a nonoxidizing carrier gas is passed through said chamber.

5. The method defined in claim 1 wherein a minor proportion of said calcium is replaced with another alkaline-earth-metal cation.

6. The method defined in claim 1 wherein said mixture is produced by dissolving said chlorides in a nonaqueous solvent, evaporating the resultant solution to dryness, and then melting the residue of said evaporation in a carbon boat.

7. The method defined in claim 6 wherein crystals of said phosphor are produced by said reaction, and said method includes washing said crystals with a solvent to dissolve away residual unreacted chlorides.

8. The method defined in claim 7 including grinding said washed crystals to a powder and then annealing said powder by heating in a reducing gaseous atmosphere for 1 to 10 hours at about 1000° to 1100° C.

* * * * *